United States Patent [19]
Jenney

[11] 3,715,017
[45] Feb. 6, 1973

[54] INCHING VALVE WITH BYPASS VALVE FOR FILLING CLUTCHES

[75] Inventor: Asa R. Jenney, Battle Creek, Mich.
[73] Assignee: Clark Equipment Company
[22] Filed: Oct. 30, 1970
[21] Appl. No.: 85,537

[52] U.S. Cl. ............. 192/4 A, 192/13 R, 192/87.19, 192/109 F, 137/115, 91/413, 60/52 HE
[51] Int. Cl. ..................... B60k 29/02, F16d 67/04
[58] Field of Search ......... 192/4 A, 4 C, 13 R, 109 F, 192/85 R, 87.18, 87.19

[56] References Cited

UNITED STATES PATENTS

| 2,464,538 | 3/1949 | Vanderzee | 192/87.18 |
| 3,243,025 | 3/1966 | Staab et al. | 192/87.19 |
| 2,814,371 | 11/1957 | Bolster et al. | 192/13 R |
| 3,125,201 | 3/1964 | Fisher | 192/4 A |

FOREIGN PATENTS OR APPLICATIONS 1,952,000  5/1970  Germany ........................... 192/4 C

*Primary Examiner*—Benjamin W. Wyche
*Attorney*—Kenneth C. Witt, John C. Wiessler, Robert H. Johnson and Lewis J. Lamm

[57] ABSTRACT

A system for controlling gradual engagement and disengagement of the forward and reverse clutches of a fluid power shifted transmission. The system includes a pump for supplying pressurized fluid to the clutches via a pressure regulating valve responsive to brake actuation and a clutch selector valve. Connected between the pump and selector valve is a normally open valve which bypasses the regulator valve and is operable to close when the pressure of fluid being supplied to the selector valve rises above a predetermined pressure.

3 Claims, 2 Drawing Figures

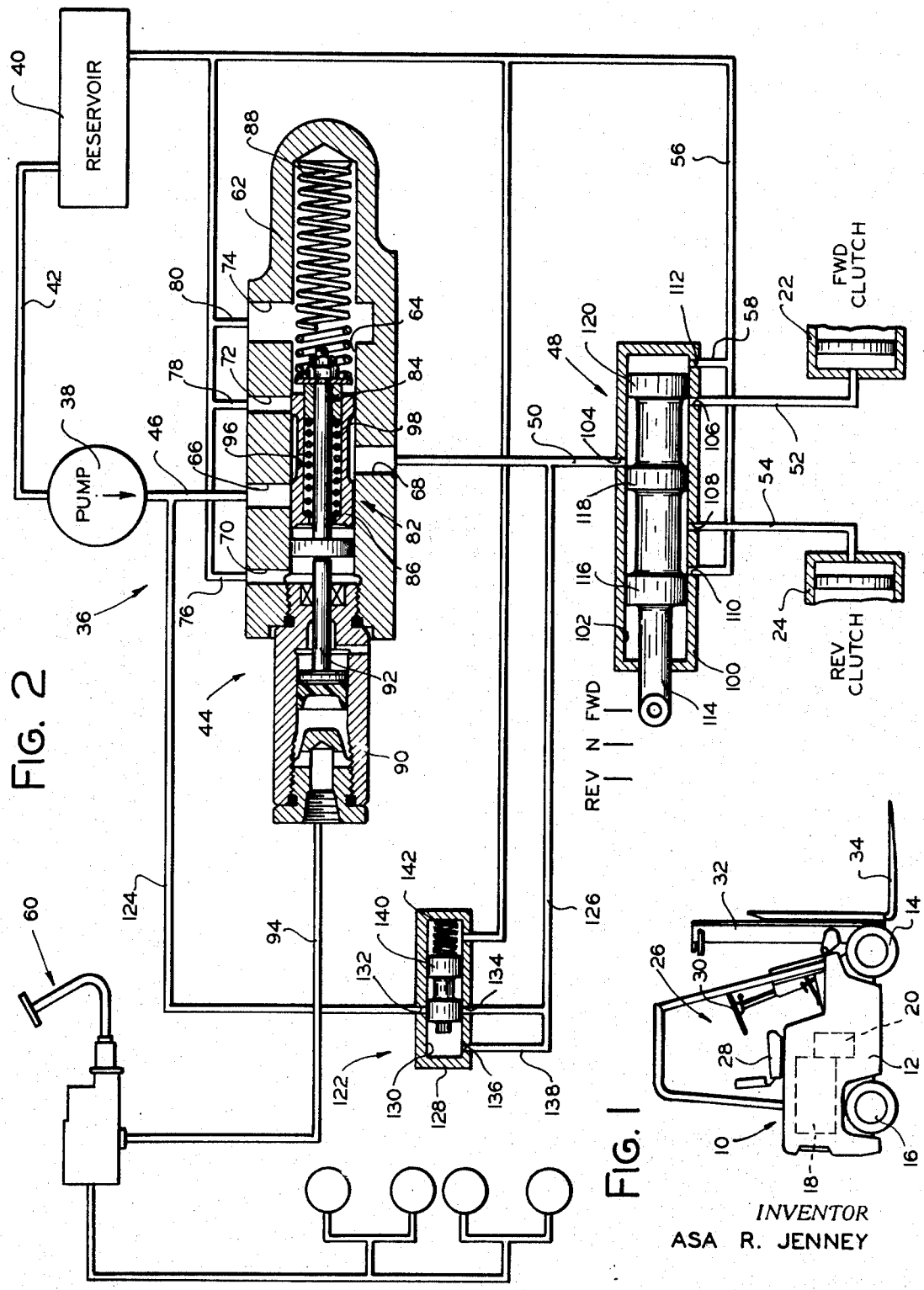

ness of operation of the lift truck when a direction reversal is made during the "inching" mode of operation.

INCHING VALVE WITH BYPASS VALVE FOR FILLING CLUTCHES

BACKGROUND OF THE INVENTION

The field of art to which this invention relates includes fluid handling, and more specifically a correlating system with a pressure reducing inlet valve.

In the operation of industrial lift trucks having fluid power shifted transmissions it is frequently desirable to operate the engine of the lift truck at a high speed while moving the truck forwardly or rearwardly very slowly. In order to accomplished this mode of operation (commonly referred to as "inching") it is usual practice to partially disengage the appropriate forward or reverse fluid actuated clutch by reducing the pressure of fluid supplied to the clutch by use of a pressure regulating valve which reduces pressure in response to increased brake actuation. An exemplary system is disclosed in U.S. Pat. No. 3,143,127. Such a system is generally satisfactory, but can result in objectionably rough operation of the lift truck when a direction reversal is made while the truck is in the "inching" mode of operation. The rough operation occurs because the fluid actuated reverse clutch, assuming a shift from forward to reverse drive, must fill with fluid before pressure builds up, causing it to engage. Since the fluid to fill the clutch must be metered past the regulating valve which is in its pressure regulating position during "inching" of the truck, it is possible for the operator to move the pressure regulating valve to a higher pressure position before the clutch fills with fluid sufficiently to engage. If this occurs the truck will lurch rearwardly when the clutch does engage because of the substantial clutch engagement due to the higher fluid pressure and the high speed at which the engine is running during "inching." Therefore, it is a principal object of my invention to provide an improved inching system which gives a smooth direction reversal of the associated vehicle during the "inching" mode of operation.

SUMMARY OF THE INVENTION

In carrying out my invention in a preferred embodiment, I provide a pump which draws fluid from a reservoir and supplies it to a pressure regulating valve which in turn supplies fluid to a clutch selector valve. The selector valve is operable to direct fluid to one of a pair of fluid actuated clutches while communicating the other of the pair of clutches with the reservoir and vice versa. Connected between the pump and selector valve is a normally open valve which bypasses the regulating valve and is operable to close when the pressure of fluid being supplied to the selector valve rises above a predetermined pressure.

The above and other objects, features and advantages of my invention will be more readily understood by persons skilled in the art when the drawings are taken in conjunction with the detailed description.

BRIEF DESCRIPTION OF THE DRAWING

FIG. 1 shows an industrial lift truck embodying my invention and

FIG. 2 is a schematic diagram of my improved inching system.

DESCRIPTION OF THE PREFERRED EMBODIMENT

Referring to FIG. 1, the reference numeral 10 denotes generally an industrial lift truck having a body 12 supported by a pair of drive wheels 14 and a pair of dirigible wheels 16. An engine 18 is disposed in body 12 and is connected to drive wheels 14 through a power shifted transmission 20 which includes a fluid pressure actuated forward clutch 22 (see FIG. 2) and a fluid pressure actuated reverse clutch 24 (see FIG. 2). Located on body 12 is an operator's station 26 which includes a seat 28, a steering control wheel 30 and various hand and foot controls. Mounted on the front of lift truck 10 is a telescopic upright 32 which carries a pair of forwardly extending load engaging fork arms 34 adapted to be inserted into a pallet on which a load is placed.

Referring now to FIG. 2, my improved "inching" system will be described. Inching system 36 includes a pump 38 which draws fluid from a reservoir 40 via a fluid conduit 42 and supplies pressurized fluid to a pressure regulating or inching valve 44 via a fluid conduit 46. Inching valve 44 is connected to a clutch selector or direction control valve 48 by means of a fluid conduit 50 so that pressurized fluid from regulator valve 44 can be supplied to selector valve 48. Selector valve 48 is connected to forward clutch 22 by a conduit 52, connected to reverse clutch 24 by a conduit 54 and connected to reservoir 40 by a conduit 56 and a branch conduit 58.

Regulating valve 44 is responsive to actuation of the vehicle brake system 60 to decrease the pressure of fluid being supplied to selector valve 48 by pump 38 as actuation of brake system 60 increases. Regulating valve 44 includes a body 62 in which a bore 64 is located. Disposed in body 62 and communicating with bore 64 is an inlet port 66 to which fluid conduit 46 is connected, an outlet port 68 to which fluid conduit 50 is connected and vent ports 70, 72 and 74 which are connected back to reservoir 40 via conduit 56 and conduit 76 and branch conduits 78 and 80. Slidably disposed in bore 64 is a compound spool 82 which includes an inner spool member 84 and an outer spool member 86. Inner spool member 84 is biased toward the left by a spring 88 and is movable toward the right by means of a fluid pressure actuator 90 which includes a rod 92 that engages the adjacent end of inner spool member 84. At this point it will be noted that actuator 90 is connected to brake system 60 by a conduit 94 so that pressurized fluid generated by brake system 60 causes rod 92 to move toward the right, and thus shift inner spool member 84 towards the right against the bias of spring 88. Outer spool member 86 includes a fluid passage 96 which communicates pressurized fluid to the left end of outer spool member 86 so that it is biased toward the right against the force of spring 98. As a result the pressure of fluid being supplied to selector valve 48 via conduit 50 from regulating valve 44 can be controlled by metering the flow of fluid past port 66 and balancing the force acting on the left end of outer spool member 86 against the bias of spring 98 which may be varied depending upon the position of inner spool member 84 as determined by the position of actuator 90 due to pressure generated by brake system 60.

Selector valve 48 includes a body 100 in which a bore 102 is located. Disposed in body 100 and communicating with bore 102 is an inlet port 104 connected to conduit 50, a forward clutch port 106 connected to conduit 52, a reverse clutch port 108 connected to conduit 54, a vent port 110 connected to conduit 56 and a vent port 112 connected to branch conduit 58. Slidably disposed in bore 102 is a spool 114 which includes three axially spaced-apart lands 116, 118 and 120. Lands 116, 118 and 120 cooperate with ports 104, 106, 108, 110 and 112 to communicate various ones of the ports with each other. Spool 114 can be positioned in a neutral position so that inlet port 104 is blocked from communicating with either one of ports 106 and 108 while at the same time port 106 is in communication with port 112 and port 108 is in communication with port 110 with the result that clutches 22 and 24 are vented back to reservoir 40. Spool 114 also can be shifted to a forward position in which port 104 is in communication with port 106 so that pressurized fluid from pump 38 is being directed to clutch 22. At the same time port 108 is in communication with port 110 so that clutch 24 is vented back to reservoir 40 and a reverse position in which port 104 is placed in communication with port 108 to direct pressurized fluid from pump 38 to clutch 24 and at the same time port 106 is placed in communication with port 112 so that clutch 22 is vented back to reservoir 40.

Inching system 36 also includes an on-off valve 122 connected between pump 38 and selector valve 48 to bypass regulating valve 44. Valve 122 is connected to fluid conduit 46 by a conduit 124 and is connected to conduit 50 by a conduit 126. Valve 122 includes a body 128 with a bore 130 therein. Located in body 128 are three ports 132, 134 and 136 which communicate with bore 130. Port 132 is connected to conduit 124, port 134 is connected to conduit 126 and port 136 is connected to a branch conduit 138 which in turn is connected to conduit 126. Slidably disposed in bore 130 is a spool 140 which cooperates with ports 132 and 134 so that in one position of spool 140 ports 132 and 134 are placed in communication with each other and in another position of spool 140 communication between ports 132 and 134 is blocked. Disposed in bore 130 adjacent one end of spool 140 is a spring 142 which serves to bias spool 140 to the position in which ports 132 and 134 are placed in communication. At this point it will be clear that when valve 122 is open that fluid from pump 138 can bypass regulating valve 44 and be supplied directly to selector valve 48 until the pressure in conduit 126 becomes sufficiently high enough so that the force exerted on the end of spool 140 opposite spring 142, overcomes the bias of spring 142, thereby causing spool 140 to shift to the right and block communication between ports 132 and 134.

In order to enable persons skilled in the art to better understand my invention, I will now explain the operation of it. It will be assumed that the operator of lift truck 10 is traveling in a forward direction so that selector valve 48 is conditioned as shown on FIG. 2, and further that the operator now wishes to drive the vehicle forward slowly while running engine 18 at high speed in order to provide a substantial oil flow to facilitate rapid elevation of upright 32. Consequently, the operator will actuate brake system 60 to partially apply the brakes. At the same time this action generates a fluid pressure which is communicated through conduit 94 to actuator 90 which moves spool 82 to a regulating position, as shown in FIG. 2, so that outer spool member 86 meters fluid past port 66 and to the extent necessary bypasses fluid through port 72 back to reservoir 40 so that the pressure of fluid in conduit 50 being delivered to selector valve 48 and hence forward clutch 22 is reduced. Consequently, clutch 22 is partially disengaged, thereby permitting it to slip with the result that engine 18 can be run at high speed and lift truck 10 moved slowly forward. At this point it should be noted that with selector valve 48 positioned as shown in FIG. 2 that reverse clutch 24 is in communication with reservoir 40 so that clutch 24 is not completely filled with fluid. It will also be noted that valve 122 is closed since the force of pressurized fluid conduit 50 is sufficient to overcome the bias of spring 142 whereby spool 140 is shifted to its rightward position. Now, if the operator desires to reverse direction of truck 10 while still maintaining the inching mode of operation it is necessary to shift spool 114 of selector valve 48 toward the left, as viewed in FIG. 2, so that port 104 is placed in communication with port 108 and ports 106 and 112 are placed in communication with each other. This now provides that fluid from conduit 50 will be directed to reverse clutch 24 and that fluid will be drained from forward clutch 22 back to reservoir 40. Because the operator is maintaining partial actuation of brake system 60, regulator valve 44 is metering fluid past port 66 to provide a reduced fluid pressure in conduit 50, and so the flow of fluid through the regulating valve from pump 38 to selector valve 48 is restricted, although there will be a substantial demand for fluid immediately following shifting of selector valve from the forward position to the reverse position since reverse clutch 24 must be filled with fluid before any pressure can be generated to engage the clutch. In order to reduce the time lag required for filling clutch 24 following a direction reversal, valve 122 has been provided. When selector valve 48 is shifted from the forward position to the reverse position the pressure in conduit 50 will drop substantially to zero and as a result spring 142 will shift spool 140 toward the left, thereby opening valve 122 and providing a path for fluid to flow from pump 38 to selector valve 48 while bypassing regulating valve 44. When reverse clutch 24 is filled with fluid and the pressure in conduit 50 comes back up spool 40 will shift back to the right against the bias of spring 142, thereby closing valve 122. When this occurs the pressure of fluid being supplied to valve 48 will be regulated by regulating valve 44, as before.

This avoids the necessity to shift, as well as the possibility of accidentally shifting, regulating valve 44 to a position for maintaining a higher pressure so as to permit a greater fluid flow through the valve, and hence rapid filling of clutch 24. As pointed out earlier, such operation results in rough operation of the lift truck due to the substantial clutch engagement when the clutch does engage while the engine is operating at high speed.

While only a single embodiment of my invention has been described, it will be understood that the detailed description is illustrative only and that my invention is subject to various modifications and changes which would fall within the scope and spirit of my invention.

Consequently, the limits of my invention should be determined from the claims.

I claim:

1. For use with a vehicle having brakes and a transmission with first and second fluid actuated clutches, an inching system comprising a reservoir, a pump connected to said reservoir, a pressure regulating valve, first fluid conduit means connecting said pump and regulating valve, a clutch selector valve connected to the first and second clutches and said reservoir, second fluid conduit means connecting said selector valve to said regulating valve, said regulating valve being responsive to brake actuation and operable to decrease the pressure of fluid being supplied to said selector valve as brake actuation increases, said selector valve being operable to direct fluid to one of the clutches and communicate the other clutch with said reservoir and vice versa, and means connected to said first and second fluid conduit means for bypassing said regulating valve, the means for bypassing the regulating valve comprising an on-off valve connected between first and second fluid conduit means, said valve being normally open and operable to close when fluid pressure reaches a predetermined level in the second fluid conduit means.

2. For use with a vehicle having brakes and a transmission with a selector direction control valve and including first and second fluid actuated clutches, an inching system comprising a reservoir, a source of fluid under pressure, a pressure regulating inching valve, a first fluid conduit means connecting the pressure source and the inching valve, the clutch selector direction control valve connected to the first and second clutches and said reservoir, said selector direction control valve being operable to direct fluid to one of the fluid actuated clutches and communicate the other clutch with said reservoir and vice versa, second fluid conduit means connecting the inching valve and the selector direction control valve, said inching valve being responsive to brake actuation and operable to decrease the pressure of fluid being supplied to said selector direction control valve as brake actuation increases, the improvement comprising an on-off bypass valve connected between said first and second fluid conduit means to bypass said pressure regulating inching valve, said on-off bypass valve being normally open and operable to close when pressure reaches a predetermined level in the second fluid conduit means.

3. The improvement as set forth in claim 2 wherein said bypass valve is operable to be open between said first and second fluid conduit means for bypassing said pressure regulating inching valve when the fluid pressure in said second conduit means falls below a predetermined pressure.

* * * * *